United States Patent
Zimmermann et al.

(10) Patent No.: US 8,753,577 B2
(45) Date of Patent: Jun. 17, 2014

(54) INTEGRATED HYDROCARBON CRACKING AND PRODUCT OLEFIN CRACKING

(75) Inventors: Joseph E. Zimmermann, Arlington Heights, IL (US); Charles P. Luebke, Mount Prospect, IL (US); John B. Baker, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 1306 days.

(21) Appl. No.: 12/512,202

(22) Filed: Jul. 30, 2009

(65) Prior Publication Data
US 2009/0291031 A1  Nov. 26, 2009

Related U.S. Application Data

(62) Division of application No. 11/293,057, filed on Dec. 2, 2005, now abandoned.

(51) Int. Cl.
| | |
|---|---|
| *B01J 8/00* | (2006.01) |
| *B01J 8/18* | (2006.01) |
| *C10G 35/14* | (2006.01) |
| *C10G 47/00* | (2006.01) |

(52) U.S. Cl.
CPC . *B01J 8/18* (2013.01); *C10G 35/14* (2013.01); *C10G 47/00* (2013.01)
USPC ............................ 422/140; 422/620; 196/139

(58) Field of Classification Search
CPC .......... B01J 8/18; B01J 8/1836; C10G 35/14; C10G 47/00
USPC ............ 422/139, 140, 610, 614, 620; 196/46, 196/138, 139
See application file for complete search history.

(56) References Cited

U.S. PATENT DOCUMENTS

| | | | | |
|---|---|---|---|---|
| 3,954,599 | A * | 5/1976 | Ooka | 208/89 |
| 5,015,364 | A * | 5/1991 | Harandi | 208/236 |
| 6,410,813 | B1 * | 6/2002 | Dath et al. | 585/653 |
| 6,646,175 | B1 * | 11/2003 | Dath et al. | 585/651 |
| 7,128,827 | B2 * | 10/2006 | Tallman et al. | 208/78 |
| 7,375,257 | B2 * | 5/2008 | Dath et al. | 585/653 |

* cited by examiner

*Primary Examiner* — Nina Bhat
(74) *Attorney, Agent, or Firm* — Arthur E Gooding

(57) ABSTRACT

Processing scheme and arrangement for increasing the relative yield of light olefins involves integration of the cracking a heavy hydrocarbon feedstock to produce an effluent comprising a range of hydrocarbon products including $C_4$-$C_7$ olefins and the subsequent cracking at least a portion of the $C_4$-$C_7$ olefins to produce additional light olefins.

5 Claims, 1 Drawing Sheet

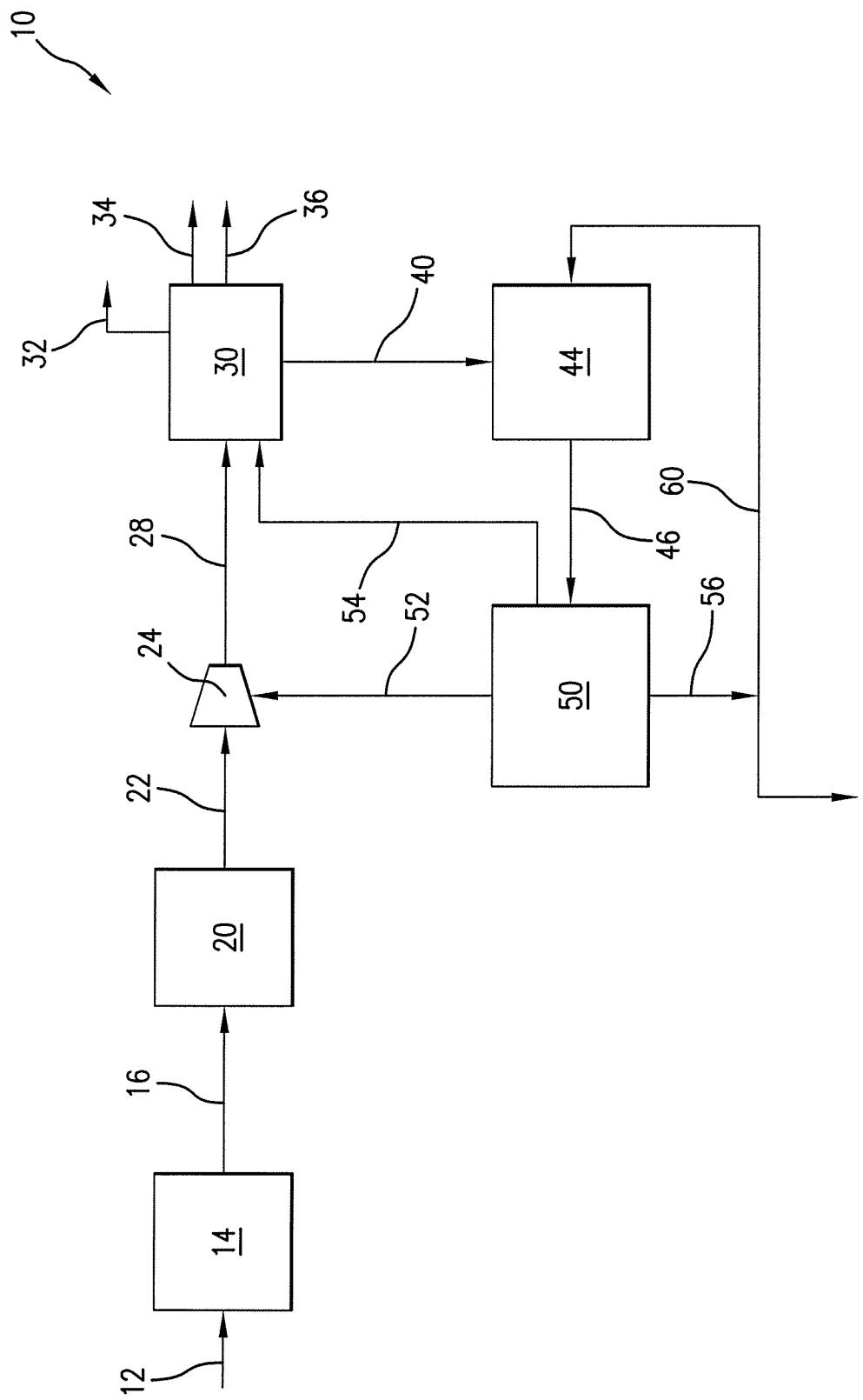

INTEGRATED HYDROCARBON CRACKING AND PRODUCT OLEFIN CRACKING

CROSS-REFERENCE TO RELATED APPLICATION

This application is a Division of U.S. application Ser. No. 11/293,057 filed Dec. 2, 2005, now abandoned, the contents of which are hereby incorporated by reference in its entirety.

BACKGROUND OF THE INVENTION

This invention relates generally to hydrocarbon processing and, more particularly, to integrated processing of a heavy hydrocarbon feedstock to increase the yield of light olefins.

Light olefins serve as feed materials for the production of numerous chemicals. Light olefins have traditionally been produced through the processes of steam or catalytic cracking of hydrocarbons such as derived from petroleum sources. Fluidized catalytic cracking (FCC) of heavy hydrocarbon streams is commonly carried out by contacting a starting material whether it be vacuum gas oil, reduced crude, or another source of relatively high boiling hydrocarbons with a catalyst such as composed of finely divided or particulate solid material. The catalyst is transported in a fluid-like manner by transmitting a gas or vapor through the catalyst at sufficient velocity to produce a desired regime of fluid transport. Contact of the oil with the fluidized material catalyzes the cracking reaction.

The cracking reaction typically deposits coke on the catalyst. Catalyst exiting the reaction zone is spoken of as being "spent", i.e., partially deactivated by the deposition of coke upon the catalyst. Coke is comprised of hydrogen and carbon and can include other materials in trace quantities such as sulfur and metals that enter the process with the starting material. Coke interferes with the catalytic activity of the spent catalyst by blocking acid sites on the catalyst surface where the cracking reactions take place. Spent catalyst is traditionally transferred to a stripper that removes adsorbed hydrocarbons and gases from catalyst and then to a regenerator for purposes of removing the coke by oxidation with an oxygen-containing gas. An inventory of catalyst having a reduced coke content, relative to the spent catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated between the reaction zone and the regeneration zone. The fluidized catalyst, as well as providing a catalytic function, acts as a vehicle for the transfer of heat from zone to zone. FCC processing is more fully described in U.S. Pat. No. 5,360,533 to Taganiolila et al., U.S. Pat. No. 5,584,985 to Lomas, U.S. Pat. No. 5,858,206 to Castillo and U.S. Pat. No. 6,843,906 B1 to Eng, the contents of each of these patents are hereby incorporated by reference. Specific details of the various contact zones, regeneration zones, and stripping zones along with arrangements for conveying the catalyst between the various zones are well known to those skilled in the art.

The FCC reactor cracks gas oil or heavier feeds into a broad range of products. Cracked vapors from the FCC unit enter a separation zone, typically in the form of a main column, that provides a gas stream, a gasoline cut, light cycle oil (LCO) and clarified oil (CO) which includes heavy cycle oil (HCO) components. The gas stream may include dry gas, i.e., hydrogen and $C_1$ and $C_2$ hydrocarbons, and liquefied petroleum gas ("LPG"), i.e., $C_3$ and $C_4$ hydrocarbons, also sometimes commonly referred to as wet gas. In view of the increasing need and demand for light olefins such as ethylene and propylene for various petrochemical uses such as the production of polyethylene, polypropylene, acrylonitrile and the like as well as the desire to produce relatively less of heavier olefins such as butylenes and pentenes which are generally less desirable as gasoline blending components due to environmental considerations, it may be desired to increase the relative amount of light olefins in the resulting product slate.

Thus, there is a need and a demand for a processing arrangement effective to result in an increased relative yield of light olefins.

SUMMARY OF THE INVENTION

A general object of the invention is to provide an improved process and system for producing an increased yield of $C_2$ and $C_3$ olefins from a heavy hydrocarbon feedstock.

A more specific objective of the invention is to overcome one or more of the problems described above.

The general object of the invention can be attained, at least in part, through an integrated process for cracking a heavy hydrocarbon feedstock to produce an effluent comprising a range of hydrocarbon products including $C_4$-$C_7$ olefins and for subsequently cracking at least a portion of the $C_4$-$C_7$ olefins to produce additional $C_2$ and $C_3$ olefins. In accordance with one embodiment, such an integrated process involves contacting the heavy hydrocarbon feedstock with a hydrocarbon cracking catalyst in a primary fluidized bed reactor to produce a hydrocarbon effluent comprising a range of hydrocarbon products comprising $C_4$-$C_7$ olefins. The hydrocarbon effluent is separated in a hydrocarbon separation system to recover selected hydrocarbon fractions including a first hydrocarbon fraction comprising $C_4$-$C_7$ olefins. At least a portion of the first hydrocarbon fraction is cracked to form a cracked olefin effluent comprising $C_2$ and $C_3$ olefins. The cracked olefin effluent is subsequently treated in the hydrocarbon separation system to recover at least the $C_2$ and $C_3$ olefins.

The prior art generally fails to a processing scheme and arrangement that is as effective and efficient in increasing the relative yield of light olefins as may be desired as compared to conventional hydrocarbon cracking processing.

In accordance with another embodiment there is provided an integrated process for cracking a heavy hydrocarbon feedstock to produce an effluent comprising a range of hydrocarbon products including $C_5$ olefins and for cracking $C_5$ olefin hydrocarbon products to produce $C_2$ and $C_3$ olefins. The heavy hydrocarbon feedstock is contacted with a hydrocarbon cracking catalyst in a primary fluidized bed reactor to produce a hydrocarbon effluent comprising a range of hydrocarbon products including $C_5$ olefins. The hydrocarbon effluent is separated to form a wet gas stream comprising $C_5$ and lighter hydrocarbons. The wet gas stream is compressed via a first compressor. The compressed wet gas stream is treated in a gas concentration system to at least separately concentrate and remove $C_2$ hydrocarbon products, concentrate and recover $C_3$ and $C_4$ hydrocarbon products and separate $C_5$ olefin hydrocarbon products. The separated $C_5$ olefin hydrocarbon products are in turn cracked to form a cracked olefin effluent comprising $C_2$-$C_4$ hydrocarbons including $C_2$ and $C_3$ olefins. The cracked olefin effluent is subsequently treated in the gas concentration system to recover the $C_2$ and $C_3$ olefins.

In yet another embodiment, there is provided an integrated system for cracking a heavy hydrocarbon feedstock to produce an effluent comprising a range of hydrocarbon products including $C_5$ olefins and for cracking $C_5$ olefin hydrocarbon products to produce $C_2$ and $C_3$ olefins. The integrated system includes a fluidized catalytic cracking reactor wherein the heavy hydrocarbon feedstock contacts a hydrocarbon cracking catalyst at hydrocarbon cracking reaction conditions to produce a hydrocarbon effluent comprising a range of hydrocarbon products including $C_5$ olefins. A separator is provided to separate the hydrocarbon effluent to form a wet gas stream comprising $C_5$ and lighter hydrocarbons. A first compressor is provided to compress the wet gas stream. A gas concentration system is provided wherein the compressed wet gas stream is processed to at least separately concentrate and remove $C_2$ paraffinic hydrocarbon products, concentrate and recover $C_3$ and $C_4$ hydrocarbon products and separate $C_5$ olefin hydrocarbon products. The integrated system further includes an olefin cracking reactor wherein the $C_5$ olefin hydrocarbon products are cracked to form a cracked olefin effluent comprising $C_2$-$C_4$ hydrocarbons including $C_2$ and $C_3$ olefins. A first return line is also provided and wherein at least a portion of the cracked olefin effluent is introduced into the first compressor and subsequently processed through the gas concentration system.

As used herein, references to "light olefins" are to be understood to generally refer to $C_2$ and $C_3$ olefins, i.e., ethylene and propylene.

Other objects and advantages will be apparent to those skilled in the art from the following detailed description taken in conjunction with the appended claims and drawing.

BRIEF DESCRIPTION OF THE DRAWING

The FIGURE is a simplified schematic diagram of an integrated hydrocarbon and product olefin cracking process in accordance with one embodiment

DETAILED DESCRIPTION OF THE INVENTION

A heavy hydrocarbon feedstock can be cracked to produce and process an effluent comprising a range of hydrocarbon products including $C_4$-$C_7$ olefins. At least a portion of such $C_4$-$C_7$ olefins can subsequently be cracked to produce additional $C_2$ and $C_3$ olefins.

The FIGURE schematically illustrates a system, generally designated by the reference numeral 10, for the integrated processing of a heavy hydrocarbon feedstock to produce or result in an increased relative amount of light olefins in accordance with one embodiment.

More particularly, in the system 10, a suitable heavy hydrocarbon feedstock is introduced via a feed line 12 into a fluidized catalytic cracking section 14 wherein the heavy hydrocarbon feedstock contacts with a hydrocarbon cracking catalyst in a primary fluidized bed reactor to produce a hydrocarbon effluent comprising a range of hydrocarbon products including $C_4$-$C_7$ olefins.

Suitable fluidized catalytic cracking sections for use in the practice of such an embodiment may, as is known in the art, desirably comprise a primary FCC reactor, a regenerator and a secondary reactor. Those skilled in the art and guided by the teachings herein provided, however, will appreciate that many fluidized catalytic cracking configurations are possible. Thus, all such other possible embodiments are considered within the scope of the present invention.

A wide range of FCC catalyst materials, such as known in the art, can be used. For example, such catalyst materials may include high activity crystalline alumina silicate or zeolite-containing catalysts. Thus it is to be understood that the broader practice of the invention is not necessarily limited by or to the use of specific or particular catalyst materials.

The relatively heavier feeds suitable for processing in accordance herewith include conventional FCC feedstocks or higher boiling hydrocarbon feeds. A common conventional feedstock is vacuum gas oil which is typically a hydrocarbon material prepared by vacuum fractionation of atmospheric residue and which has a broad boiling range of from 315-622° C. (600-1150° F.) and, more typically, which has a narrower boiling point range of from 343-551° C. (650-1025° F.). Such fractions are generally low in coke precursors and heavy metals which can deactivate the catalyst. The effluent from the fluidized catalytic cracking section 14, shown as the line 16, may be processed in a separator 20, e.g., a main column, into fractions that include a hydrocarbon effluent comprising a range of hydrocarbon products including $C_4$-$C_7$ olefins, shown as the line 22. To facilitate illustration and discussion, other fraction lines such as including a heavy gasoline stream, a light cycle oil ("LCO") stream, a heavy cycle oil ("HCO") stream and a clarified oil ("CO") stream, for example, are neither shown nor hereinafter specifically described.

The hydrocarbon effluent fraction from the line 22 is introduced into a first compressor 24 and compressed to form the compressed hydrocarbon effluent fraction line 28. The compressed hydrocarbon effluent from the line 28 is introduced into a gas concentration or product recovery system 30 wherein the compressed hydrocarbon effluent is processed to at least separately concentrate and recover $C_2$ paraffinic hydrocarbon products (shown as the line 32), concentrate and recover $C_3$ and $C_4$ hydrocarbon products (shown as the lines 34 and 36, respectively) and separate and recover $C_4$-$C_7$ olefins hydrocarbon products (shown as the line 40).

At least a portion of the $C_4$-$C_7$ olefins hydrocarbon products from the line 40 are introduced into an olefin cracking reactor 44 wherein the $C_5$ olefin hydrocarbon products are cracked to form a cracked olefin effluent, shown as the line 46, comprising $C_2$ and $C_3$ olefins.

The cracked olefin effluent from the line 46 is introduced into a separation system 50 wherein the cracked olefin effluent is separated into a vapor stream (shown as the line 52) comprising $C_2$ and $C_3$ olefins, a liquid stream (shown as the line 54) comprising $C_4$ hydrocarbons and a third stream (shown as the line 56) comprising $C_5$ hydrocarbons.

As shown, the vapor stream from the line 52 may desirably be introduced or returned to the first compressor 24; the liquid stream from the line 54 may desirably be introduced or returned to the gas concentration or product recovery system 30; and at least a portion of the third stream comprising $C_5$ hydrocarbons, shown as the line 60, may desirably be introduced or returned to the olefin cracking reactor 44. In this way, the vapor stream and particularly the $C_2$ and $C_3$ olefins may be appropriately further processed by being compressed in the first compressor 24 and then undergo product recovery processing in the product recovery system 30; the liquid stream, in turn, may be appropriately further processed by undergoing product recovery processing in the product recovery system 30; and at least the portion of the $C_5$ hydrocarbons returned to the olefin cracking reactor 44 may be appropriately further processed such as by undergoing olefin cracking. Thus, such vapor and liquid streams can be appropriately recycled back through the gas concentration system with a lesser or reduced impact on the flow rates throughout the gas concentration system.

In accordance with one preferred embodiment, the fraction in the line 22 is desirably a wet gas stream desirably composed of $C_5$ and lighter hydrocarbons. Thus, in accordance with such a preferred embodiment, the wet gas stream is introduced into the first compressor and compressed to form a compressed wet stream line. The compressed wet gas stream is introduced into the gas concentration or product recovery system wherein the compressed wet gas stream is processed to at least separately concentrate and recover $C_2$ paraffinic hydrocarbon products (e.g., the line 32), concentrate and recover $C_3$ and $C_4$ hydrocarbon products (e.g., the lines 34 and 36, respectively) and separate and recover $C_5$ olefin hydrocarbon products (e.g., the line 40).

The $C_5$ olefin hydrocarbon products from the line 40 are introduced into an olefin cracking reactor 44 wherein the $C_5$ olefin hydrocarbon products are cracked to form a cracked olefin effluent, shown as the line 46, comprising $C_2$-$C_4$ hydrocarbons including $C_2$ and $C_3$ olefins.

Embodiments, such as described above, desirably provide or result in improved processing of a heavy hydrocarbon feedstock to produce an increased relative yield of light olefins and which processing is desirably more effective and/or efficient than heretofore reasonably possible via conventional hydrocarbon cracking processing. More specifically, such embodiments through the targeted introduction or return of specified materials can significantly improve processing economics. For example, such processing can desirably minimize the amounts of materials requiring pressurization and/or gas concentration/product recovery processing.

In accordance with particular such embodiments, a heavy hydrocarbon feedstock can be fluidized catalytically cracked to produce an effluent including a range of hydrocarbon products including $C_4$-$C_7$ olefins with at least a portion of such $C_4$-$C_7$ olefins subsequently being cracked to produce additional $C_2$ and $C_3$ olefins.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. An integrated system for cracking a heavy hydrocarbon feedstock to produce an effluent comprising a range of hydrocarbon products including $C_5$ olefins and for cracking $C_5$ olefin hydrocarbon products to produce $C_2$ and $C_3$ olefins, said integrated system comprising:

a fluidized catalytic cracking reactor wherein the heavy hydrocarbon feedstock contacts a hydrocarbon cracking catalyst at hydrocarbon cracking reaction conditions to produce a hydrocarbon effluent comprising a range of hydrocarbon products including $C_5$ olefins;

a separator to separate the hydrocarbon effluent to form a wet gas stream comprising $C_5$ and lighter hydrocarbons;

a first compressor to compress the wet gas stream;

a gas concentration system wherein the compressed wet gas stream is processed to at least separately concentrate and remove $C_2$ paraffinic hydrocarbon products, concentrate and recover $C_3$ and $C_4$ hydrocarbon products and separate $C_5$ olefin hydrocarbon products;

an olefin cracking reactor wherein at least a portion of the $C_5$ olefin hydrocarbon products are cracked to form a cracked olefin effluent comprising $C_2$-$C_4$ hydrocarbons including $C_2$ and $C_3$ olefins;

a first return line wherein at least a portion of the cracked olefin effluent is introduced into the first compressor and subsequently processed through the gas concentration system; and a cracked olefin effluent separation system effective to separate the cracked olefin effluent into a vapor stream comprising $C_2$ and $C_3$ olefins, a liquid stream comprising $C_4$ hydrocarbons and a third stream comprising $C_5$ hydrocarbons.

2. The system of claim 1 wherein at least a portion of the vapor stream is introduced into the first compressor via the first return line.

3. The system of claim 1 additionally comprising a second return line wherein at least a portion of the liquid stream is introduced into the gas concentration system at a point subsequent to the first compressor.

4. The system of claim 1 additionally comprising an olefin cracking reactor return line wherein at least a portion of the third stream $C_5$ hydrocarbons are returned to the olefin cracking reactor.

5. The system of claim 1 wherein the $C_5$ olefin hydrocarbon products cracked in the olefin cracking reactor consist essentially of n-$C_5$ olefin hydrocarbon products.

* * * * *